July 9, 1946.  C. T. WILLSON  2,403,893
CUTTING ATTACHMENT FOR HOES
Filed March 29, 1945
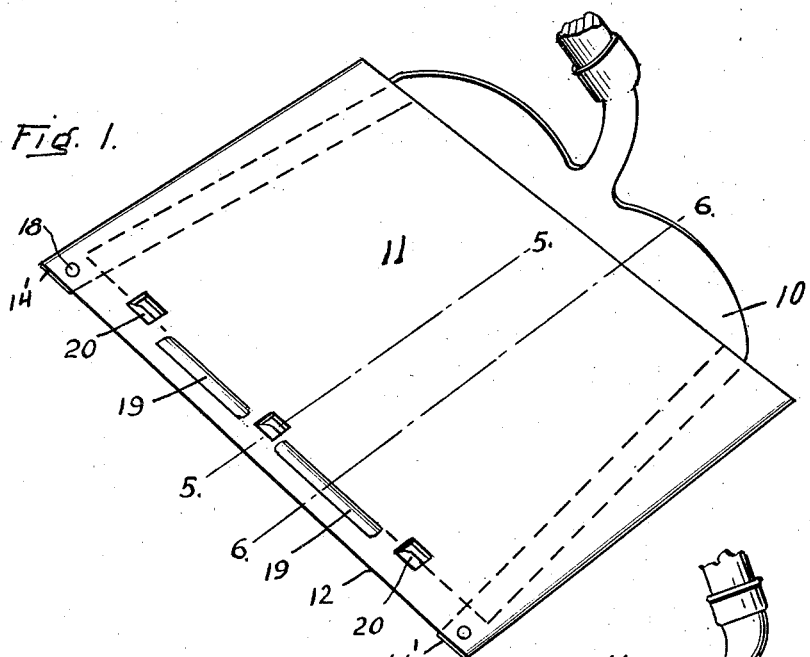
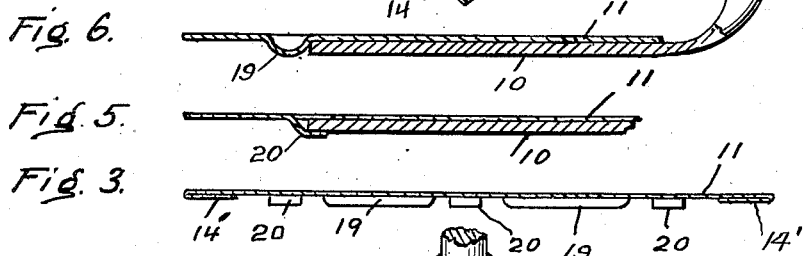
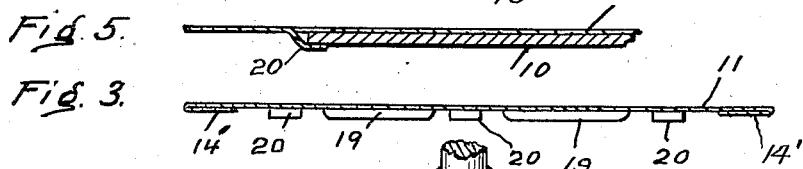
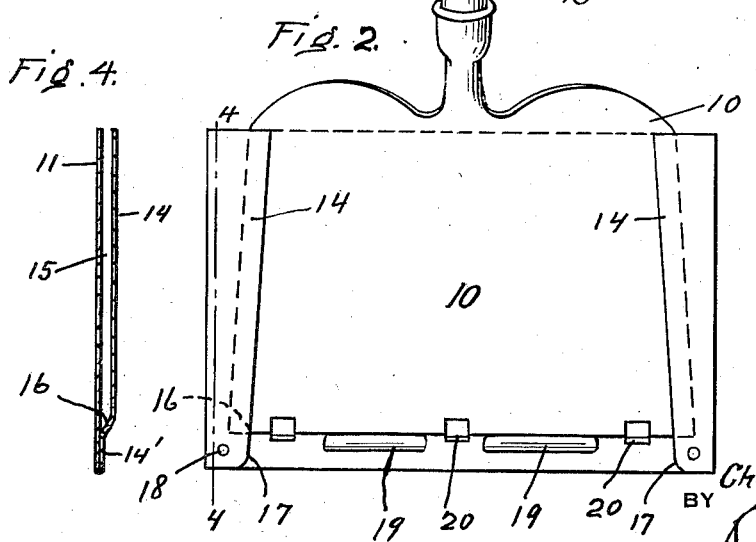
INVENTOR
Charles T Willson
BY
ATTORNEY Patented July 9, 1946

2,403,893

UNITED STATES PATENT OFFICE 2,403,893

CUTTING ATTACHMENT FOR HOES

Charles T. Willson, Canaan, Conn., assignor to Local Industries, Incorporated, Lakeville, Conn., a corporation of Connecticut Application March 29, 1945, Serial No. 585,429

10 Claims. (Cl. 97—66)

Hoe blades are usually formed of ordinary steel which wears away rapidly when used so that it is necessary to repeatedly sharpen them.

To overcome this difficulty and the expense and loss of time I have designed a device for hoe blades which can be readily attached. This device is in the form of a thin reinforced hardened steel or alloy plate having a sharp cutting edge. This plate has resilient side flanges to be slipped over the edges of a hoe blade and stops or seats for taking up the thrust of the blade against the plate when the hoe is used.

It is my object to provide a cutting device which can be made cheaply and which can be readily attached to a hoe blade.

Fig. 1 is a perspective view of a device embodying the preferred form of my invention shown attached to a hoe blade.

Fig. 2 is a bottom view of the attachment.

Fig. 3 is an edge view of the attachment.

Fig. 4 is a sectional view on the plane of the line 4—4 of Fig. 2.

Fig. 5 is a sectional view on the plane of the line 5—5 of Fig. 1.

Fig. 6 is a sectional view on the plane of the line 6—6 of Fig. 1.

The blade 10 of the hoe is of the conventional form. The cutting attachment 11 is formed of a hard metal plate such as a hardened steel or alloy and has a cutting edge 12. It need be only about half the thickness of the hoe blade. The side edges of the plate are folded over so as to form flanges 14 and leave grooves 15 to receive the edges of the hoe blade.

The lower ends 14' of the flanges are closed against the corners of the main part of the plate so as to reinforce them as shown in Figs. 2, 3 and 4. The corners may be rounded off as shown at 17 in Fig. 2 and welded or riveted at 18 so as to prevent dirt or weeds from being jammed between the flanges and the adjacent parts of the plate. When the plate is slipped on to the hoe blade it is pushed on until it reaches a stop and is then held by the friction of the flanges. These flanges are resilient so as to accommodate the device to slight variations or irregularities in thickness of the hoe blade and so as to fit an old hoe blade which may have been worn on the edges. As many hoes are widest at the toe or cutting edge and taper toward the heel, it is desirable to have the flanges somewhat wide at the inner ends so as to ensure better engagement along the side edges.

Stop means is provided for limiting the relative movement of the attachment on the hoe blade. This limitation or stop action can be effected in several ways for instance by using the bottom 16 of the groove 15 as a stop or by a rib or ribs 19 or lugs 20, 20. The ribs 19 also reinforce the plate adjacent the cutting edge. The lugs 20 also couple the plate 11 to the blade 10 so as to prevent buckling of the plate. One or more lugs 20 may be located between the flanges 14 with rib sections 19 and a lug 20 may be located adjacent each flange, or the ribs 19 may be omitted.

Preferably I employ the stops or seats 16, 16 for the blade at the bottom of the grooves 15, 15, and at least one lug 20 between the side flanges to serve as seats to take up the thrust or shock of cutting. A rib 19 may also serve as a guard to keep dirt and weeds from wedging between the plate 11 and the blade 10.

The attachment is preferably made of relatively thin metal and therefore adds but little to the weight of the hoe. The hoe blade reinforces the cutting plate and prevents it from bending.

Such an attachment may be used on a new or old hoe and being much harder than the usual hoe blade makes it unnecessary to be repeatedly sharpening the blade.

I claim:

1. A cutting attachment for hoes formed of thin sheet steel and having its edges folded over to form grooves to receive the side edges of a hoe blade and having seating means for taking up the relative thrust, and having a cutting edge projecting beyond the seating means.

2. A cutting attachment for hoes comprising a hardened metal plate having folded side edges for sliding over the side edges of a hoe blade and having a transverse rib serving as a seat for the blade and to prevent foreign matter from packing between the plate and the blade and having a cutting edge projecting beyond said rib.

3. A cutting attachment for hoes comprising a hardened metal plate having its opposite side edges folded to form grooves to receive the corresponding side edges of a hoe blade, the lower ends of said edges of the plate being closed together and forming with the intermediate edge of the plate a cutting edge.

4. A cutting attachment for hoes comprising a thin metal plate having a cutting edge and having means at its side edges for attachment to a hoe blade and a transverse stop rib and an offset lug for the blade between the side edges of the plate.

5. A cutting attachment for hoes comprising a thin metal plate having means at its side edges for attachment to a hoe blade and an offset lug between the side edges for interlocking with the blade and having a cutting edge.

6. A cutting attachment for hoes comprising a thin metal plate having flanges at its side edges for gripping the edges of a hoe blade, the bottom edge of the plate constituting a cutting edge between the side edges, means for reinforcing the corners of the cutting edge and means for interlocking the central part of the plate with the edge of the hoe blade.

7. A cutting attachment for hoes comprising a thin metal plate having a cutting edge and having side flanges abutting said plate at their lower ends and spaced away therefrom thereabove to form grooves for receiving the edges of the hoe blade, the bottoms of the grooves forming stops for limiting the inward movement of the hoe blade, and one or more lugs on the plate between said flanges for interlocking the blade to the plate.

8. A cutting attachment for a hoe blade comprising a metallic plate having a cutting edge and having resilient flanges bent over at opposite edges to form grooves to receive the side edges of the hoe blade and to reinforce the cutting corners of the plate and abutment means for the hoe blade between the flanges.

9. A cutting attachment for a hoe blade comprising a metallic plate having a cutting edge and having resilient flanges bent over at opposite side edges to form grooves to receive the side edges of the hoe blade and to reinforce the cutting corners of the plate and an interlocking lug projecting from the plate to engage the hoe blade to prevent the plate from buckling between the side edges.

10. A cutting attachment for a hoe blade comprising a metallic plate having a cutting edge and having resilient flanges bent over at opposite side edges to form grooves to receive the side edges of the hoe blade and to reinforce the cutting corners of the plate and a rib extending transversely of the plate between the side flanges to serve as an abutment for the hoe blade.

CHARLES T. WILLSON.